US012669856B2

(12) United States Patent
Wang et al.

(10) Patent No.: US 12,669,856 B2
(45) Date of Patent: Jun. 30, 2026

(54) POWER MANAGEMENT DEVICE AND CONSUMER ELECTRONIC PRODUCT

(71) Applicant: VIA LABS, INC., New Taipei City (TW)

(72) Inventors: Tze-Shiang Wang, New Taipei City (TW); Hui-Neng Chang, New Taipei City (TW); Nai-Chuan Hung, New Taipei City (TW); Sheng-Hsien Yen, New Taipei City (TW)

(73) Assignee: VIA LABS, INC., New Taipei City (TW)

( * ) Notice: Subject to any disclaimer, the term of this patent is extended or adjusted under 35 U.S.C. 154(b) by 607 days.

(21) Appl. No.: 17/895,027

(22) Filed: Aug. 24, 2022

(65) Prior Publication Data

US 2022/0404891 A1 Dec. 22, 2022

Related U.S. Application Data

(63) Continuation-in-part of application No. 17/110,312, filed on Dec. 3, 2020, now Pat. No. 11,770,015.
(Continued)

(30) Foreign Application Priority Data

Oct. 26, 2020 (TW) ................................. 109137149
Jul. 25, 2022 (TW) ................................. 111127824

(51) Int. Cl.
*G06F 1/32* (2019.01)
*G06F 1/26* (2006.01)
*G06F 1/3234* (2019.01)

(52) U.S. Cl.
CPC ................ *G06F 1/26* (2013.01); *G06F 1/266* (2013.01); *G06F 1/3253* (2013.01); *G06F 1/3275* (2013.01)

(58) Field of Classification Search
CPC ............................ G06F 1/3253; G06F 1/3275
See application file for complete search history.

(56) References Cited

U.S. PATENT DOCUMENTS 8,266,456 B2 * 9/2012 Chang ........................ H02J 7/00
713/300
9,584,041 B2 * 2/2017 Rokusek ................. H02M 7/23
(Continued)

FOREIGN PATENT DOCUMENTS

CN 107346163 11/2017
CN 114498825 5/2022
(Continued)

*Primary Examiner* — Jaweed A Abbaszadeh
*Assistant Examiner* — Cheri L Harrington
(74) *Attorney, Agent, or Firm* — JCIPRNET

(57) ABSTRACT

A power management device and a consumer electronic product are provided. The power management device is for the consumer electronic product. The power management device includes a memory and a controller. The memory stores a power information of a load of the consumer electronic product. An input end of the first voltage regulator is coupled to a power pin of an upstream USB connector, and an output end of the first voltage regulator is coupled to a power end of the load. When USB device is connected to a downstream USB connector of the consumer electronic product, the controller obtains a power demand from the USB device, the controller determines whether to change a power mode of the upstream USB connector according to the power information and the power demand, and the controller controls the second voltage regulator according to the power mode to supply power to the USB device.

12 Claims, 2 Drawing Sheets

Related U.S. Application Data

(60) Provisional application No. 63/000,507, filed on Mar. 27, 2020.

(56)                     References Cited

U.S. PATENT DOCUMENTS

| | | | |
|---|---|---|---|
| 10,489,324 B2 * | 11/2019 | Sporck | H01R 25/006 |
| 10,996,729 B2 * | 5/2021 | Piwonka | G06F 1/266 |
| 11,119,550 B2 * | 9/2021 | Tseng | G06F 1/266 |
| 11,283,265 B2 * | 3/2022 | Robinson | G06F 1/3287 |
| 11,340,676 B2 * | 5/2022 | Na | H04L 12/10 |
| 11,886,273 B2 * | 1/2024 | Woodbury | G06F 1/3296 |
| 2014/0208134 A1 * | 7/2014 | Waters | G06F 13/4282 |
| | | | 713/310 |
| 2015/0277461 A1 | 10/2015 | Anderson et al. | |
| 2017/0279270 A1 * | 9/2017 | Motoki | H02J 7/007 |
| 2018/0054070 A1 | 2/2018 | Krishnamoorthy et al. | |
| 2018/0356873 A1 * | 12/2018 | Regupathy | G06F 1/3253 |
| 2018/0375342 A1 | 12/2018 | Sultenfuss et al. | |
| 2019/0138078 A1 * | 5/2019 | Regupathy | G06F 1/3253 |
| 2019/0171268 A1 * | 6/2019 | Ellis | G06F 1/266 |
| 2019/0341786 A1 * | 11/2019 | Lee | H02J 7/00304 |
| 2020/0159300 A1 | 5/2020 | Erturk et al. | |
| 2020/0371980 A1 * | 11/2020 | Pan | G06F 13/4022 |
| 2021/0109580 A1 * | 4/2021 | Tseng | H02J 1/04 |
| 2021/0208654 A1 * | 7/2021 | Bhattacharjee | H02J 1/109 |
| 2023/0096631 A1 * | 3/2023 | Regupathy | G06F 1/3215 |
| | | | 710/15 |
| 2023/0409105 A1 * | 12/2023 | Chauhan | G06F 1/3296 |

FOREIGN PATENT DOCUMENTS

| | | |
|---|---|---|
| TW | 202030578 | 8/2020 |
| WO | 2018014471 | 1/2018 |

* cited by examiner

POWER MANAGEMENT DEVICE AND CONSUMER ELECTRONIC PRODUCT

CROSS-REFERENCE TO RELATED APPLICATION

This application is a continuation-in-part application of and claims the priority benefit of U.S. application Ser. No. 17/110,312, filed on Dec. 3, 2020, which claims the priority benefit of U.S. provisional application Ser. No. 63/000,507, filed on Mar. 27, 2020, and Taiwan application Ser. No. 109137149, filed on Oct. 26, 2020. This application also claims the priority benefit of Taiwan application serial no. 111127824, filed on Jul. 25, 2022. The entirety of each of the above-mentioned patent applications is hereby incorporated by reference herein and made a part of this specification.

BACKGROUND

Technical Field

The disclosure relates to a power supply technology, and in particular relates to a power management device and a consumer electronic product.

Description of Related Art

Generally speaking, consumer electronic products are usually connected to an external power supply device through a DC jack, so that the power supply device may supply power to the load of the consumer electronic product.

However, with the increasing awareness of environmental protection, the traditional DC jack has a large number of internal components and occupies a large circuit area, thus failing to meet the environmental protection requirements. Therefore, how to effectively improve the power transmission mode between the consumer electronic product and the power supply device is the subject for those skilled in the art.

It should be noted that the content of the "BACK-GROUND" section is used to help understand the disclosure. Some of the content (or all of the content) disclosed in the "BACKGROUND" section may not be known by those of ordinary skill in the art. The content disclosed in the "BACKGROUND" section does not mean that the content has been known to those with ordinary knowledge in the technical field before the application of the disclosure.

SUMMARY

The disclosure provides a power management device and a consumer electronic product, which may dynamically adjust the magnitude of the voltage supplied to the load and the USB device according to the power information of the load of the consumer electronic product and the power demand of the expansion connected USB device.

In an embodiment of the disclosure, a power management device is suitable for being disposed in a consumer electronic product. The power management device includes a memory and a controller. The memory is configured to store first power information of a load of the consumer electronic product. The controller is coupled to the memory and a first voltage regulator of the consumer electronic product. An input end of the first voltage regulator is coupled to a power pin of an upstream USB connector of the consumer electronic product, and an output end of the first voltage regulator is coupled to a power end of the load. When at least one USB device is electrically connected to at least one downstream USB connector of the consumer electronic product, the controller obtains at least one power demand from the at least one USB device, and the controller determines whether to change a power mode of the upstream USB connector according to the first power information and the at least one power demand, and the controller controls at least one second voltage regulator of the consumer electronic product according to the power mode to supply power to the at least one USB device.

In an embodiment of the disclosure, a consumer electronic product includes a memory, a first voltage regulator, a controller, and at least one second voltage regulator. The memory is configured to store first power information of a load. An input end of the first voltage regulator is coupled to a power pin of an upstream USB connector, and an output end of the first voltage regulator is coupled to a power end of the load. The controller is coupled to the memory and the first voltage regulator. The at least one second voltage regulator is coupled to the controller and a downstream USB connector. When at least one USB device is electrically connected to the at least one downstream USB connector, the controller obtains at least one power demand from the at least one USB device, and the controller determines whether to change a power mode of the upstream USB connector according to the first power information and the at least one power demand, and the controller controls the at least one second voltage regulator according to the power mode to supply power to the at least one USB device.

Based on the above, in the power management device and the consumer electronic product according to the embodiments of the disclosure, when at least one USB device is electrically connected to at least one downstream USB connector of the consumer electronic product, the controller obtains at least one power demand from the at least one USB device, and changes a power mode of an upstream USB connector according to the power information of the load of the consumer electronic product and the at least one power demand. In this way, the controller may control the voltage regulator of the consumer electronic product to supply power to the load and the at least one USB device according to the power mode, thereby improving the compatibility between the power supply device, the load of the consumer electronic product, and the at least one USB device, and replacing the traditional DC jack.

In order to make the above-mentioned features and advantages of the disclosure comprehensible, embodiments accompanied with drawings are described in detail below.

DETAILED DESCRIPTION OF DISCLOSED EMBODIMENTS

Figure 1:
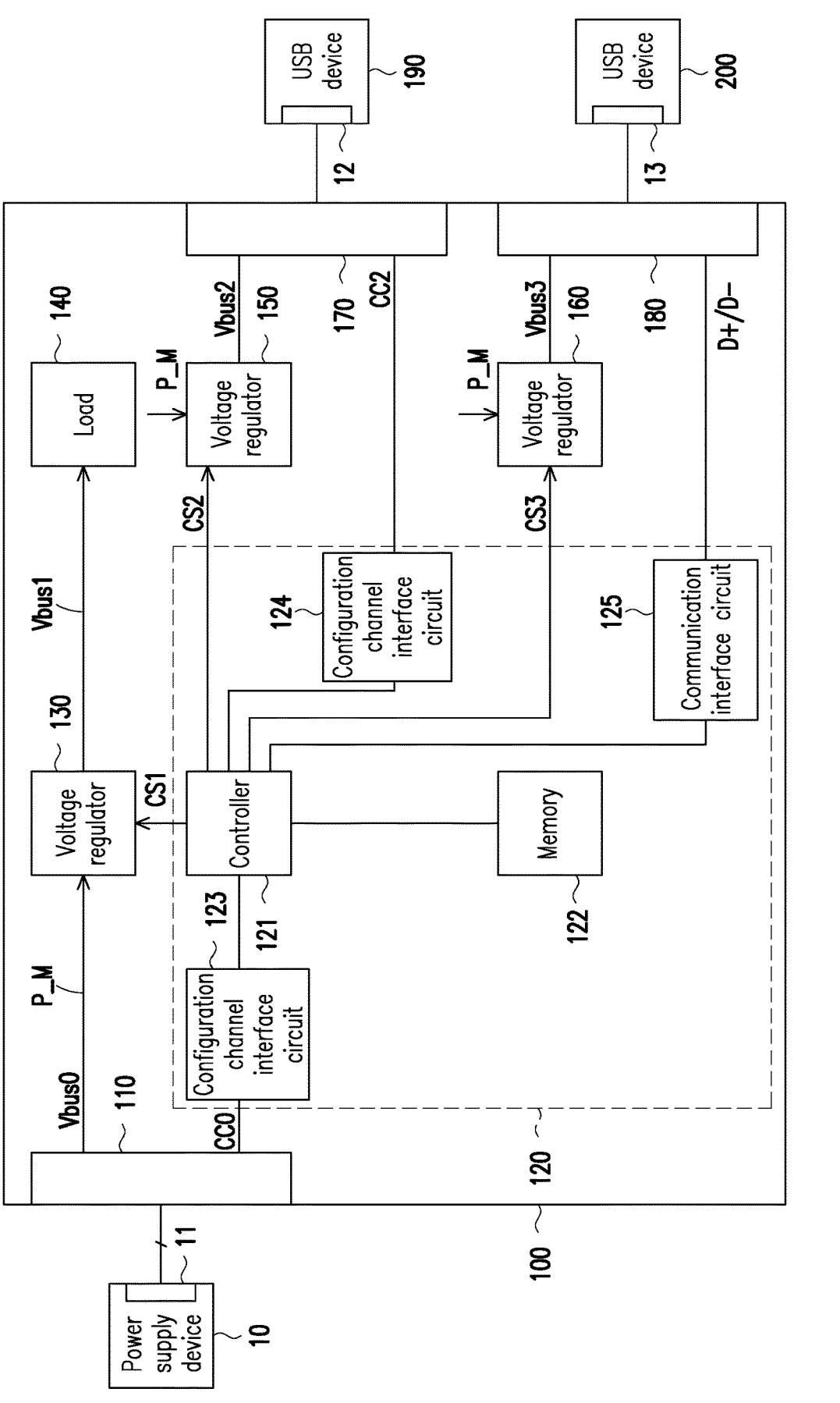
FIG. 1 is a schematic diagram of a circuit block of a consumer electronic product according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. Also, where possible, elements/components/steps using the same reference numerals in the drawings and embodiments represent the same or similar parts. Elements/components/steps that use the same reference numerals or use the same terminology in different embodiments may refer to relative descriptions of each other.

FIG. 1 is a schematic diagram of a circuit block of a consumer electronic product 100 according to an embodiment of the disclosure. In this embodiment, an upstream universal serial bus (USB) connector 110 and a downstream USB connector 170 of the consumer electronic product 100 may include USB type-C connectors. A downstream USB connector 180 of the consumer electronic product 100 may include a type-A connector. According to the design requirements, in another embodiment, the upstream USB connector 110 and the downstream USB connectors 170 and 180 may include other types of USB connectors. In other embodiments, the upstream USB connector 110 and the downstream USB connectors 170 and 180 may include other electrical connectors.

The upstream USB connector 110 of the consumer electronic product 100 may be connected to a connector 11 of a power supply device 10 via a cable. When the power supply device 10 is electrically connected to the consumer electronic product 100, the power supply device 10 may supply power to the consumer electronic product 100. According to application requirements, the power supply device 10 may include a USB charger, a USB adapter, or other power supply devices. When the power supply device 10 is a USB charger or a USB adapter, the connector 11 may include a USB type-A connector, a USB type-C connector, and/or other USB connectors.

On the other hand, the downstream USB connector 170 and the downstream USB connector 180 of the consumer electronic product 100 may be respectively connected to a connector 12 of a USB device 190 and a connector 13 of a USB device 200 via cables. When the USB device 190 and/or the USB device 200 are respectively electrically connected to the downstream USB connector 170 and/or the downstream USB connector 180, a power management device 120 may supply power to the USB device 190 and/or the USB device 200 through the downstream USB connector 170 and/or the downstream USB connector 180.

The connector 12 and the connector 13 may be connectors of different types or forms. For example, the connector 12 may include a USB type-C connector, while the connector 13 may include a USB type-A connector. In another embodiment, the connector 12 may include a USB type-A connector and/or other USB connectors, while the connector 13 may include a USB type-C connector and/or other USB connectors.

In this embodiment, the consumer electronic product 100 includes an upstream USB connector 110, a power management device 120, a voltage regulator 130, a load 140, a voltage regulator 150, a voltage regulator 160, a downstream USB connector 170, and a downstream USB connector 180. For example, in the case where the consumer electronic product 100 has an electric razor function, the load 140 may include the body of the razor, a charging base, and/or other circuits/components. In the case where the consumer electronic product 100 has a desk lamp function, the load 140 may include an LED, a human interface circuit, and/or other circuits/components. In the case where the consumer electronic product 100 has a speaker function, the load 140 may include a speaker, an amplifier circuit, a wireless communication circuit, and/or other circuits/components. The operating power required by the load 140 is provided by a local power bus Vbus1 of the consumer electronic product 100.

In this embodiment, the power management device 120 includes a controller 121, a memory 122, a configuration channel interface circuit 123, a configuration channel interface circuit 124, and a communication interface circuit 125. The power management device 120 has a power delivery (PD) function conforming to the USB standard.

The memory 122 is coupled to the controller 121. According to the design requirements, the memory 122 may include a one-time programming (OTP) memory, an electrically erasable programmable read only memory (EEPROM), and/or other non-volatile memory.

Specifically, the memory 122 may be configured to store one or more load characteristic information, a protocol profile, and/or a power profile. The power file may include voltage parameters, current parameters, and/or other power parameters. The load characteristic information may include 12-byte information. For example, 1 byte in the load characteristic information is configured to record the product ID, 1 byte in the load characteristic information is configured to record the vendor ID, 2 bytes in the load characteristic information is configured to record the power configuration information of the power supply device 10, 2 bytes in the load characteristic information is configured to record the power information of the load 140, 2 bytes in the load characteristic information is configured to record the power information (or power demand) of the USB devices 190 and 200, and 4 bytes in the load characteristic information may be a cyclic redundancy check (CRC) code.

It should be noted that, in the design/manufacturing stage of the consumer electronic product 100, the designer may pre-program data about the power configuration information of the power supply device 10, the power information of the load 140, and the power information (or the power demand) of the USB devices 190 and 200 in the load characteristic information into the memory 122.

For example, in the case where the downstream USB connector 180 of the consumer electronic product 100 includes a type-A connector, the designer may preset the power information (or power demand) of the USB device 200 in the load characteristic information to 12 W according to the standard power mode specified in the USB3.0 standard (i.e., the operating voltage of the USB device 200 is 5V and the operating current of the USB device 200 is 2.4 A).

In addition, in the case where the consumer electronic product 100 has an electric razor function, the designer may preset the power information of the load 140 in the load characteristic information to 12 W (i.e., the operating voltage of the load 140 is 12V and the operating current of the load 140 is 1 A).

It is worth mentioning that the above-mentioned power configuration information of the power supply device 10 may include one or more power data object (PDO) packets. For example, each PDO may be configured to set the power supply device 10 to operate at a set of set voltage and set current, and the maximum power of each PDO is set to 100 W. In this embodiment, the controller 121 may select a suitable set of PDOs from the PDOs according to the power information of the load 140 and the power information (or power demand) of the USB device 190 and/or the USB device 200. The controller 121 may provide the selected PDO (selected power configuration information) to the power supply device 10 through the upstream USB connector 110. Based on this, the controller 121 may negotiate the output power configuration of the power supply device 10 with the power supply device 10. The power pin Vbus0 of the upstream USB connector 110 may receive the main power P_M (selected voltage and selected current) from the power supply device 10. The upstream USB connector 110 may transmit the main power P_M from the power supply device 10 to the voltage regulators 130, 150, and/or 160. The controller 121 controls the voltage regulators 130, 150, and/or 160 according to the power information of the load 140 and the power demands of the downstream USB connectors 170 and 180 to dynamically allocate the main power P_M to the load 140 and the downstream USB connectors 170 and 180.

On the other hand, the controller 121 is coupled to the memory 122, the configuration channel interface circuit 123, the configuration channel interface circuit 124, the communication interface circuit 125 and the voltage regulator 130. The configuration channel interface circuit 123 is coupled between the controller 121 and a configuration channel (CC) pin CC0 of the upstream USB connector 110. The configuration channel interface circuit 124 is coupled between the controller 121 and the CC pin CC2 of the downstream USB connector 170. The communication interface circuit 125 is coupled to the controller 121 and a differential signal pin pair of the downstream USB connector 180 (e.g., the D+ pin and the D– pin of the downstream USB connector 180).

Specifically, in this embodiment, the controller 121 may perform the PD protocol to the power supply device 10 through the configuration channel interface circuit 123 and the CC pin CC0 of the upstream USB connector 110 based on the protocol profile stored in the memory 122, to determine the power mode of the power supply device 10 supplying power to the consumer electronic product 100.

Besides, the power management device 120 may detect the electrical state of the CC pin CC0 of the upstream USB connector 110 to determine whether the upstream USB connector 110 is connected to an external power supply device 10. When the power supply device 10 is electrically connected to the upstream USB connector 110, the power management device 120 may exchange configuration information with the power supply device 10 through the configuration channel interface circuit 123 and the CC pin CC0 of the upstream USB connector 110 based on the power profile stored in the memory 122.

Similarly, the power management device 120 may detect the electrical state of the CC pin CC2 of the downstream USB connector 170 to determine whether the downstream USB connector 170 is connected to an external USB device 190. When the USB device 190 is electrically connected to the downstream USB connector 170, the power management device 120 may exchange configuration information with the USB device 190 through the configuration channel interface circuit 124 and the CC pin CC2 of the downstream USB connector 170 based on the power profile stored in the memory 122. In addition, the power management device 120 may detect the D+ pin and the D– pin of the downstream USB connector 180 to determine whether the downstream USB connector 180 is connected to an external USB device 200. When the USB device 200 is electrically connected to the downstream USB connector 180, the power management device 120 may exchange configuration information with the USB device 200 through the communication interface circuit 125 and the D+ pin and D– pin of the downstream USB connector 180 based on the power profile stored in the memory 122.

It is particularly mentioned that, in the case where the upstream USB connector 110 and the downstream USB connector 170 include USB connectors, the configuration channel interface circuit 123 and the configuration channel interface circuit 124 may include a physical layer circuit of the CC pins conforming to the USB standard. The controller 121 may detect the CC pin of the upstream USB connector 110 and the CC pin of the downstream USB connector 170 following the USB standard. Furthermore, in the case where the downstream USB connector 180 includes a USB connector, the communication interface circuit 125 may include a physical layer circuit of a differential data channel conforming to the USB standard. The controller 121 may detect the D+ pin and the D– pin of the downstream USB connector 180 following the USB standard.

On the other hand, in this embodiment, the input end of the voltage regulator 130 is coupled to the power pin Vbus0 of the upstream USB connector 110 to receive the main power P_M. The output end of the voltage regulator 130 is coupled to the power end of the load 140. The input end of the voltage regulator 150 is coupled to the power pin Vbus0 of the upstream USB connector 110 to receive the main power P_M. The output end of the voltage regulator 150 is coupled to the power pin Vbus2 of the downstream USB connector 170. The input end of the voltage regulator 160 is coupled to the power pin Vbus0 of the upstream USB connector 110 to receive the main power P_M. The output end of the voltage regulator 160 is coupled to the power pin Vbus3 of the downstream USB connector 180.

The voltage regulator 130, the voltage regulator 150, and the voltage regulator 160 may boost or buck the main power P_M according to the control signals CS1, CS2, CS3 provided by the controller 121. The voltage regulator 130, the voltage regulator 150, and the voltage regulator 160 in this embodiment may include a boost converter, a buck converter, or other types of voltage converters. When the power supply device 10 is connected to the upstream USB connector 110 and the USB devices 190 and/or 200 are electrically connected to the downstream USB connectors 170 and/or 180, the controller 121 may select selected power configuration information from the power configuration information (PDO) about the power supply device 10 stored in the memory 122 according to the power information of the load 140 and the power demands of the USB devices 190 and/or 200. The controller 121 may provide the selected power configuration information to the upstream USB connector 110 (power supply device 10) via the configuration channel interface circuit 123. The upstream USB connector 110 may provide the main power P_M from the power supply device 10 to the voltage regulators 130, 150, and 160. The controller 121 may control the voltage regulators 130, 150, and 160 to dynamically allocate the main power P_M to the load and the downstream USB connectors 170 and/or 180 according to the power information of the load 140 and the power demands of the USB devices 190 and/or 200. When the USB devices 190 and 200 are not electrically connected to the downstream USB connectors 170 and 180, the controller 121 may dynamically request the power supply device 10 to change the power mode and control the voltage regulator 130 to supply power to the load 140.

Figure 2:
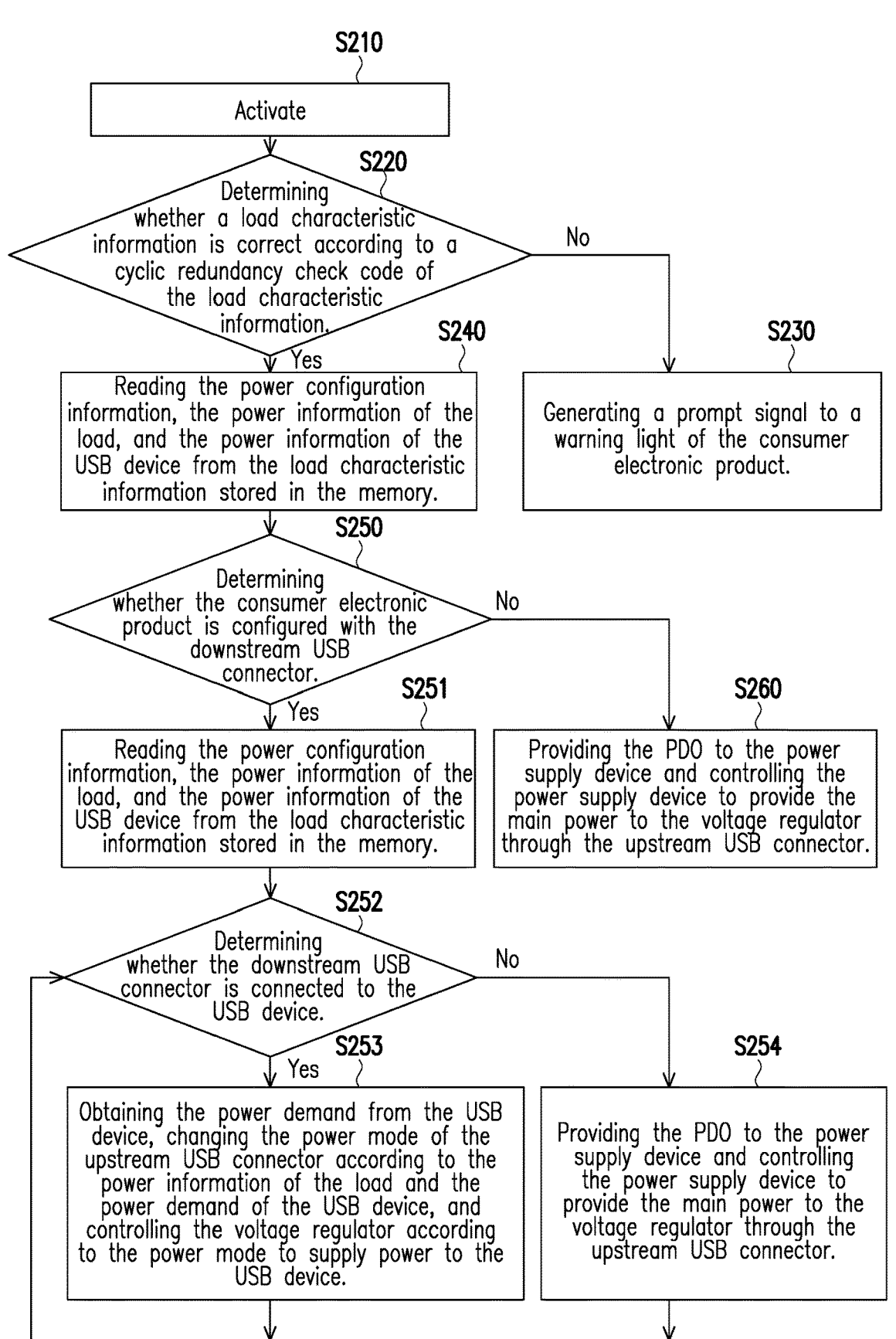
FIG. 2 is a flowchart of the operation of the controller shown in FIG. 1 according to the disclosure.

For the implementation details of the power management device 120 of the consumer electronic product 100, please refer to FIG. 1 and FIG. 2 at the same time. FIG. 2 is a flowchart of the operation of the controller 121 shown in FIG. 1 according to the disclosure. In step S210, the consumer electronic product 100 may activate the controller 121, so that the controller 121 performs the relevant operation actions. Next, the controller 121 may receive the load characteristic information stored in the memory 122.

In step S220, the controller 121 may read the load characteristic information recorded in the memory 122 of the consumer electronic product 100, and determine whether the load characteristic information is correct according to the CRC code of the load characteristic information. If the controller 121 determines that the load characteristic information is in an error state, then the operation of step S230 is subsequently executed. If the controller 121 determines that the load characteristic information does not have an error state, then the operation of step S240 is subsequently executed. In step S220, it is well known to use the CRC code of the load characteristic information stored in the memory 122 to detect or verify possible errors after data transmission or storage, therefore it is not repeated herein.

In step S230, when the CRC code indicates that the load characteristic information has an error during data transmission or after being stored in the memory 122, the controller 121 may generate a prompt signal to a warning light (not shown) disposed in the consumer electronic product 100 to prompt the user that the consumer electronic product 100 is in an error state.

In step S240, the controller 121 may start to read the power configuration information of the power supply device 10, the power information of the load 140, and the power information (or power demands) of the USB devices 190 and 200 from the load characteristic information stored in the memory 122. Next, in step S250, the controller 121 may determine whether the consumer electronic product 100 is configured with the downstream USB connector 170 and the downstream USB connector 180 according to the load characteristic information.

Specifically, if the controller 121 determines that the consumer electronic product 100 is not configured with the downstream USB connector 170 and the downstream USB connector 180, it means that one or more additional USB connectors is not disposed in the consumer electronic product 100 for connecting an external USB device. Therefore, the power supply device 10 only needs to supply power to the load 140 of the consumer electronic product 100 (e.g., an electric razor). In this case, the controller 121 may continue to perform the operation of step S260.

In step S260, the controller 121 may provide the PDO to the power supply device 10 and control the power supply device 10 to provide the main power P_M to the voltage regulator 130 through the upstream USB connector 110. For example, in step S260, when the power supply device 10 only needs to supply power to the load 140 of the consumer electronic product 100, the controller 121 may obtain the operating voltage (i.e., 12V) and the operating current (i.e., 1 A) of the load 140 according to the power information of the load 140 in the load characteristic information. The controller 121 may select a set of PDOs from the power configuration information of the power supply device 10 according to the power information of the load 140, which is in accordance with the operating voltage and operating current of the load 140. Next, the controller 121 may generate the control signal CS1 to the voltage regulator 130 according to the load characteristic information, and the controller 121 may provide the selected PDO through the configuration channel interface circuit 123 and the CC pin CC0 of the upstream USB connector 110 to the power supply device 10. The power supply device 10 may generate a selected voltage of 5V and a selected current of 3 A (i.e., the main power P_M) to the upstream USB connector 110 according to the selected PDO, and the main power P_M is provided to the voltage regulator 130 through the power pin Vbus0 of the upstream USB connector 110.

Since the operating voltage of the load 140 is 12V, the voltage regulator 130 may boost the main power P_M according to the control signal CS1, and provide the boosted power to the load 140 through the local power bus Vbus1, to supply power to the load 140.

On the other hand, in step S250, if the controller 121 determines that the consumer electronic product 100 is configured with the downstream USB connector 170 and/or the downstream USB connector 180, it means that the consumer electronic product 100 is additionally disposed with one or more additional USB connectors for connecting an external USB device. In this case, the controller 121 may continue to perform the operation of step S251.

In step S251, the controller 121 may continuously read the power configuration information, the power information of the load 140, and the power information (or power demands) of the USB devices 190 and 200 from the load characteristic information stored in the memory 122. Next, in step S252, the controller 121 may determine whether the downstream USB connector 170 and the downstream USB connector 180 are respectively connected to the USB device 190 and the USB device 200. If the controller 121 determines that the downstream USB connector 170 and the downstream USB connector 180 are not connected to the USB device 190 and the USB device 200, it means that the power supply device 10 only needs to supply power to the load 140 of the consumer electronic product 100. In this case, the controller 121 may continue to perform the operation of step S254. The operation performed by the controller 121 in step S254 may be deduced by referring to the relevant descriptions in step S260, and thus it is not repeated herein.

On the other hand, in step S252, if the controller 121 determines that the downstream USB connector 170 and/or the downstream USB connector 180 are connected to the USB device 190 and/or the USB device 200, then the controller 121 may continue to perform the operation of step S253.

In step S253, the controller 121 may obtain the power demand from the USB device 190 and/or the USB device 200, and change the power mode of the upstream USB connector 110 according to the power information of the load 140 and the power demands of the USB device 190 and/or the USB device 200. The controller 121 may control the voltage regulator 150 and/or the voltage regulator 160 according to the power mode to supply power to the USB device 190 and/or the USB device 200.

For example, in one embodiment, when the controller 121 determines in step S252 that the USB device 190 is connected to the downstream USB connector 170 and the USB device 200 is not connected to the downstream USB connector 180, it means that the power supply device 10 only needs to supply power to the load 140 of the consumer electronic product 100 and the USB device 190.

In this case, the controller 121 may obtain the power demand of the USB device 190 through the configuration channel interface circuit 124 and the CC pin CC2 of the downstream USB connector 170. It is assumed that the power demand of the USB device 190 is 12 W (i.e., the operating voltage of the USB device 190 is 12V and the operating current of the USB device 190 is 1 A).

Next, the controller 121 may determine whether the current power mode of the upstream USB connector 110

(i.e., the output power of the power supply device 10) may satisfy the power demands of the load 140 and the USB device 190 at the same time according to the power demand of the USB device 190 (i.e., 12 W) and the power information of the load 140 (i.e., 12 W).

In this regard, since the current output power of the power supply device 10 is 15 W (in the case that the power supply device 10 only needs to supply power to the load 140), and the power demands of the load 140 and the USB device 190 are both 12 W, the controller 121 may reselect (or update) a set of PDOs from the power configuration information of the power supply device 10 according to the determination result above, which may simultaneously meet the operating voltage and operating current requirements of the load 140 and the USB device 190.

After obtaining the updated PDO, the controller 121 may provide the updated PDO to the power supply device 10 through the configuration channel interface circuit 123 and the CC pin CC0 of the upstream USB connector 110. The power supply device 10 may generate a selected voltage of 9V and a selected current of 3 A (i.e., the main power P_M) to the upstream USB connector 110 according to the updated PDO. Therefore, the power pin Vbus0 of the upstream USB connector 110 may provide the updated main power P_M to the voltage regulators 130, 150, and 160.

Since the operating voltages of the load 140 and the USB device 190 are both 12V, the voltage regulator 130 and the voltage regulator 150 may boost the main power P_M according to the control signals CS1 and CS2, and the boosted power is provided to the load 140 and the USB device 190 respectively through the local power bus Vbus1 and the downstream USB connector 170, so as to supply power to the load 140 and the USB device 190.

In another embodiment, when the controller 121 determines in step S252 that the USB device 190 is connected to the downstream USB connector 170 and the USB device 200 is connected to the downstream USB connector 180, it means that the power supply device 10 needs to supply power to the load 140 of the consumer electronic product 100, the USB device 190, and the USB device 200.

In this case, the controller 121 may obtain the power demand of the USB device 190 through the configuration channel interface circuit 124 and the CC pin CC2 of the downstream USB connector 170. It is also assumed that the power demand of the USB device 190 is 12 W (i.e., the operating voltage of the USB device 190 is 12V and the operating current of the USB device 190 is 1 A).

Next, the controller 121 may determine whether the current power mode of the upstream USB connector 110 (i.e., the output power of the power supply device 10) may satisfy the power demands of the load 140, the USB device 190, and the USB device 200 at the same time according to the power demand of the USB device 190 (i.e., 12 W), the power information of the load 140 (i.e., 12 W), and the power information of the USB device 200 pre-programmed to the memory 122 (i.e., 12 W).

In this regard, since the current output power of the power supply device 10 is 15 W (in the case that the power supply device 10 only needs to supply power to the load 140), and the power demands of the load 140, USB device 190, and the USB device 200 are all 12 W, the controller 121 may reselect (or update) a set of PDOs from the power configuration information of the power supply device 10 according to the determination result above, which may simultaneously meet the operating voltage and operating current requirements of the load 140, USB device 190, and the USB device 200.

After obtaining the updated PDO, the controller 121 may provide the updated PDO to the power supply device 10 through the configuration channel interface circuit 123 and the CC pin of the upstream USB connector 110. The power supply device 10 may generate a selected voltage of 15V and a selected current of 3 A (i.e., the main power P_M) to the upstream USB connector 110 according to the updated PDO. Therefore, the power pin Vbus0 of the upstream USB connector 110 may provide the main power P_M to the voltage regulator 130, the voltage regulator 150, and the voltage regulator 160.

Since the operating voltages of the load 140, the USB device 190, and the USB device 200 respectively are 12V, 12V, and 5V, the voltage regulator 130, the voltage regulator 150, and the voltage regulator 160 may buck (step down) the main power P_M according to the control signals CS1, CS2, and CS3, and the bucked power is provided to the load 140, the USB device 190, and the USB device 200, so as to supply power to the load 140, the USB device 190, and the USB device 200.

It is worth mentioning that, after the controller 121 completes the operation of step S253 or step S254, the controller 121 may continue to perform the operation of step S252.

According to different design requirements, the implementation of the blocks of the power management device 120 and/or the controller 121 may be hardware, firmware, software (i.e., programs), or a combination of more than one of the above-mentioned three implementations.

In terms of hardware, the above-mentioned blocks of the power management device 120 and/or the controller 121 may be implemented as logic circuits on an integrated circuit. The above-mentioned functions of the power management device 120 and/or the controller 121 may be implemented as hardware using hardware description languages (such as Verilog HDL or VHDL), or other suitable programming languages. For example, the above-mentioned related functions of the power management device 120 and/or the controller 121 may be implemented in one or more controllers, microcontrollers, microprocessors, application-specific integrated circuits (ASIC), digital signal processor (DSP), field programmable gate array (FPGA), and/or various logic blocks, modules, and circuits in other processing units.

In terms of software and/or firmware, the above-mentioned related functions of the power management device 120 and/or the controller 121 may be implemented as programming codes. For example, the power management device 120 and/or the controller 121 may be implemented using general programming languages (e.g., C, C++, or assembly language) or other suitable programming languages. The programming code may be recorded/stored in a recording medium, for example, the recording medium includes a read only memory (ROM), a storage device, and/or a random access memory (RAM). A computer, a central processing unit (CPU), a controller, a microcontroller, or a microprocessor may read and execute the programming code from the recording medium, thereby achieving related functions. A "non-transitory computer readable medium" may be used as the recording medium, for example, a tape, a disk, a card, a semiconductor memory, or a programming designable logic circuit, etc. Furthermore, the program may be supplied to a computer (or CPU) via an arbitrary transmission medium (a communication network or a broadcast wave, etc.). The communication network is, for example, the Internet, a wired communication, a wireless communication, or other communication media.

To sum up, in the power management device and the consumer electronic product according to the embodiments of the disclosure, when at least one USB device is electrically connected to at least one downstream USB connector of the consumer electronic product, at least one power demand is obtained from at least one USB device through the controller, and a power mode of an upstream USB connector is changed according to the power information of the load of the consumer electronic product and the at least one power demand. In this way, the controller may control the voltage regulator of the consumer electronic product to supply power to the load and the at least one USB device according to the power mode, thereby improving the compatibility between the power supply device, the load of the consumer electronic product, and the at least one USB device, and replacing the traditional DC jack.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A power management device, suitable for being disposed in a consumer electronic product, the power management device comprising:
    a memory, configured to store first power information of load characteristic information of a load of the consumer electronic product and store power configuration information of a power supply device; and
    a controller, coupled to the memory and a first voltage regulator of the consumer electronic product, wherein an input end of the first voltage regulator is coupled to a power pin of an upstream USB connector of the consumer electronic product, an output end of the first voltage regulator is coupled to a power end of the load,
    wherein the controller determines whether the consumer electronic product is configured with at least one downstream USB connector according to the load characteristic information, and determines whether the at least one downstream USB connector is connected to at least one USB device of the consumer electronic device,
    when the at least one USB device is electrically connected to the at least one downstream USB connector of the consumer electronic product, the controller obtains at least one power demand from the at least one USB device, the controller determines whether to change a power mode of the upstream USB connector according to a total power requirement based on a combination of the first power information and the at least one power demand, and the controller controls at least one second voltage regulator of the consumer electronic product according to the power mode of the upstream USB connector to supply power to the at least one USB device,
    wherein when the power supply device is connected to the upstream USB connector and the at least one USB device is electrically connected to the at least one downstream USB connector, the controller selects selected power configuration information from the power configuration information according to the first power information and the at least one power demand, the controller provides the selected power configuration information to the power supply device to negotiate an output power configuration of the power supply device with the power supply device to provide a main power,
    wherein the main power is supplied from the upstream USB connector to the first voltage regulator and the at least one second voltage regulator, and wherein the controller is configured to control the first voltage regulator and the at least one second voltage regulator to dynamically allocate the main power between the load and the at least one downstream USB connector.

2. The power management device according to claim 1, wherein the power management device further comprises:
    a configuration channel interface circuit, coupled between a configuration channel pin of the upstream USB connector and the controller; and
    at least one communication interface circuit, coupled between the at least one downstream USB connector and the controller.

3. The power management device according to claim 2, wherein
    the controller provides the selected power configuration information to the upstream USB connector via the configuration channel interface circuit, the upstream USB connector provides the main power from the power supply device to the first voltage regulator and the at least one second voltage regulator, and the controller controls the first voltage regulator and the at least one second voltage regulator to dynamically allocate the main power to the load and the at least one downstream USB connector according to the first power information and the at least one power demand.

4. The power management device according to claim 3, wherein the power supply device comprises a USB charger or a USB adapter.

5. The power management device according to claim 1, wherein when the at least one USB device is not electrically connected to the at least one downstream USB connector of the consumer electronic product, the controller dynamically requests the power supply device to change the power mode and controls the first voltage regulator to supply power to the load.

6. The power management device according to claim 1, wherein at least one of the first voltage regulator and the at least one second voltage regulator comprises a boost converter or a buck converter.

7. A consumer electronic product, comprising:
    an upstream USB connector;
    a first voltage regulator, having an input end coupled to a power pin of the upstream USB connector;
    a load, having a power end coupled to an output end of the first voltage regulator;
    at least one downstream USB connector;
    at least one second voltage regulator, having an output end coupled to the at least one downstream USB connector; and
    a power management device, comprising:
    a memory, configured to store first power information of load characteristic information of the load and store power configuration information of a power supply device; and
    a controller, coupled to the memory, the first voltage regulator, and the at least one second voltage regulator, wherein
    the controller determines whether the consumer electronic product is configured with the at least one downstream USB connector according to the load characteristic information, and determines whether the at least one downstream USB connector is connected to at least one USB device of the consumer electronic device, when the at least one USB device is electrically connected to the at least one downstream USB connector, the controller obtains at least one power demand from the at least one USB device, the controller determines whether to change a power mode of the upstream USB connector according to a total power requirement based on a combination of the first power information and the at least one power demand, and the controller controls the at least one second voltage regulator according to the power mode of the upstream USB connector to supply power to the at least one USB device, wherein when the power supply device is connected to the upstream USB connector and the at least one USB device is electrically connected to the at least one downstream USB connector, the controller selects selected power configuration information from the power configuration information according to the first power information and the at least one power demand, the controller provides the selected power configuration information to the power supply device to negotiate an output power configuration of the power supply device with the power supply device to provide a main power, wherein the main power is supplied from the upstream USB connector to the first voltage regulator and the at least one second voltage regulator, and wherein the controller is configured to control the first voltage regulator and the at least one second voltage regulator to dynamically allocate the main power between the load and the at least one downstream USB connector.

8. The consumer electronic product according to claim 7, wherein the consumer electronic product further comprises:

a configuration channel interface circuit, coupled between a configuration channel pin of the upstream USB connector and the controller; and at least one communication interface circuit, coupled between the at least one downstream USB connector and the controller.

9. The consumer electronic product according to claim 8, wherein the controller provides the selected power configuration information to the upstream USB connector via the configuration channel interface circuit, the upstream USB connector provides the main power from the power supply device to the first voltage regulator and the at least one second voltage regulator, and the controller controls the first voltage regulator and the at least one second voltage regulator to dynamically allocate the main power to the load and the at least one downstream USB connector according to the first power information and the at least one power demand.

10. The consumer electronic product according to claim 9, wherein the power supply device comprises a USB charger or a USB adapter.

11. The consumer electronic product according to claim 7, wherein when the at least one USB device is not electrically connected to the at least one downstream USB connector, the controller dynamically requests the power supply device to change the power mode and controls the first voltage regulator to supply power to the load.

12. The consumer electronic product according to claim 7, wherein at least one of the first voltage regulator and the at least one second voltage regulator comprises a boost converter or a buck converter.

* * * * *